US010799938B2

(12) United States Patent
Skolaude (10) Patent No.: US 10,799,938 B2
(45) Date of Patent: Oct. 13, 2020

(54) SETTING UNIT AND METHOD FOR SETTING A CONNECTING UNIT ON A WORKPIECE

(71) Applicant: RICHARD BERGNER VERBINDUNGSTECHNIK GMBH & CO. KG, Schwabach (DE)

(72) Inventor: Andreas Skolaude, Schwabach (DE)

(73) Assignee: Richard Bergner Verbindungstechnik GmbH & Co. KG, Schwabach (DE)

( * ) Notice: Subject to any disclaimer, the term of this patent is extended or adjusted under 35 U.S.C. 154(b) by 410 days.

(21) Appl. No.: 15/457,370

(22) Filed: Mar. 13, 2017

(65) Prior Publication Data

US 2017/0259326 A1 Sep. 14, 2017

(30) Foreign Application Priority Data

Mar. 14, 2016 (DE) .................. 10 2016 204 170

(51) Int. Cl.
| | | |
|---|---|---|
| *B21D 28/26* | (2006.01) | |
| *B23P 19/06* | (2006.01) | |
| *B21J 15/32* | (2006.01) | |
| *B21J 15/30* | (2006.01) | |

(Continued)

(52) U.S. Cl.
CPC .............. *B21J 15/26* (2013.01); *B21D 28/26* (2013.01); *B21J 15/025* (2013.01); *B21J 15/30* (2013.01); *B21J 15/32* (2013.01); *B23P 19/062* (2013.01)

(58) Field of Classification Search
CPC .... B21D 28/00; B21D 28/002; B21D 28/005; B21D 28/24; B21D 28/26; B21D 28/34; B21D 28/346; B21J 15/00; B21J 15/025; B21J 15/30; B21J 15/32; Y10T 29/49943; Y10T 29/49956; Y10T 29/5343; Y10T 29/5377
See application file for complete search history.

(56) References Cited

U.S. PATENT DOCUMENTS

| | | | | |
|---|---|---|---|---|
| 2,356,526 | A | * 8/1944 | Mayer | ...................... B21J 15/02 29/34 B |
| 3,802,310 | A | * 4/1974 | Maurer | ................ B21D 28/002 83/527 |
| 4,831,698 | A | 5/1989 | Muller | |

(Continued)

FOREIGN PATENT DOCUMENTS

| | | |
|---|---|---|
| DE | 750791 C | 9/1953 |
| DE | 3835566 A1 | 5/1989 |

(Continued)

*Primary Examiner* — Tyrone V Hall, Jr.
*Assistant Examiner* — Makena S Markman
(74) *Attorney, Agent, or Firm* — Laurence A. Greenberg; Werner H. Stemer; Ralph E. Locher (57) ABSTRACT

A setting unit and a method for setting a connecting element on a work piece. The setting unit has a hold-down clamp. A punch is displaceably mounted in the hold-down clamp, is drivable in a feed direction by way of a plunger and has a front punch head, and a punch sleeve which surrounds the punch head. The punch sleeve is movable together with the punch in the feed direction to a first stroke position. The punch head is movable relative to the punch sleeve to a second stroke position such that it is possible to carry out both a hole punching operation and a setting operation by way of the one punch in connection with the punch sleeve.

21 Claims, 5 Drawing Sheets

(51) Int. Cl.
    *B21J 15/02*     (2006.01)
    *B21J 15/26*     (2006.01)

(56) References Cited

U.S. PATENT DOCUMENTS

| | | | | |
|---|---|---|---|---|
| 5,079,983 | A * | 1/1992 | Bruhn | B21D 28/002 |
| | | | | 227/131 |
| 5,214,991 | A * | 6/1993 | Shimizu | B21D 28/24 |
| | | | | 83/100 |
| 5,315,857 | A * | 5/1994 | Bakermans | B21D 28/002 |
| | | | | 72/402 |
| 5,964,393 | A | 10/1999 | Feldpausch et al. | |
| 8,146,240 | B2 * | 4/2012 | Mauer | B21J 15/025 |
| | | | | 29/243.53 |
| 8,397,362 | B2 * | 3/2013 | Burg | B21J 15/041 |
| | | | | 29/243.53 |
| 9,339,899 | B2 | 5/2016 | Doo et al. | |
| 9,568,135 | B2 * | 2/2017 | Lehmann | F16L 37/22 |
| 2016/0167109 | A1 | 6/2016 | Hauw | |

FOREIGN PATENT DOCUMENTS

| | | |
|---|---|---|
| DE | 9318967 U1 | 2/1994 |
| EP | 3031548 A1 | 6/2016 |
| WO | 9601161 A1 | 1/1996 |
| WO | 2012063022 A2 | 5/2012 |
| WO | 2016055478 A1 | 4/2016 |
| WO | 2016156359 A2 | 10/2016 |

\* cited by examiner

SETTING UNIT AND METHOD FOR SETTING A CONNECTING UNIT ON A WORKPIECE

BACKGROUND OF THE INVENTION

Field of the Invention:

The invention relates to a setting unit as well as to a method for setting connecting elements on a workpiece.

The connecting elements are, for example, press-fit elements such as press-fit nuts, press-fit bolts, press-fit screws or also rivets which are press-fitted into a workpiece (component), usually a metal sheet, as result of exerting a predetermined press-fit force. In addition, the connecting elements can also be other screws or also rivets or bolts. The connecting elements are fastened on the workpiece by means of a so-called setting unit in the case of automated methods or also in the case of a part-automated method. Said setting unit is conventionally realized as a press-fit unit which comprises a hydraulically/pneumatically/electrically movable plunger which exerts a press-in force onto the connecting element in the setting direction. WO 2016/156359 A2 discloses an electric direct drive for a setting unit.

The connecting elements are conventionally fed to a setting head of the setting unit by means of a feed unit. A setting unit designated as a feed block is disclosed in WO 2016/055478 A1.

Insofar as the press-fit elements are not self-punching elements, a hole, into which the press-fit element is inserted, has to be punched into the workpiece prior to the setting operation. This requires an additional operation. A so-called punching slug is generated in this case during the hole punching operation and this has to be disposed of.

In many areas of application, in this case, it is important to achieve as fast as possible a cycle rate for fastening the connecting elements on the workpiece. This also relates, in particular, to the motor vehicle industry.

Processing machines, in particular also industrial robots where the setting unit is arranged on a robot hand which is movable freely in space, are frequently used, in this case, for automatic setting. In particular, in the case of motor vehicles, the connecting elements are frequently arranged on complex bodywork components, the fastening points sometimes being difficult for the setting unit to access on account of a complex component geometry.

BRIEF SUMMARY OF THE INVENTION

Proceeding from here, the object underlying the invention is to provide a setting unit and a method for the rapid setting of connecting elements on a workpiece.

The object is achieved according to the invention by a setting unit with the claimed features as well as by a method for setting connecting elements with the claimed features.

The advantages and preferred designs, which are noted with regard to the setting unit, are also to be transferred analogously to the method.

The setting unit generally includes a hold-down clamp as well as a punch, which is displaceably mounted in the hold-down clamp and is drivable by means of the plunger. The plunger, in this case, is usually moved in a feed direction by means of a drive. During the processing operation, a component is pressed against a holder, in particular against a die, for example a punching die or also a press-fit die, by way of the hold-down clamp. The actual processing operation is effected by means of the punch. A hole (punching) operation or also a setting operation for press-fitting a connecting element, in particular a press-fit nut or also a press-fit bolt, is carried out as an option using the punch. The punch generally comprises a punch head which is realized, in particular, as a stamping head, by way of which—in particular when interacting with a suitable die—a hole punching operation is able to be carried out.

It is particularly important, in this connection, for both the hole (punching) operation and the setting operation to be able to be carried out by means of the setting unit. Both operations are effected, in this case, by means of the one common punch.

In order to carry out said dual function, the punch is surrounded by a punch sleeve. The punch and the punch sleeve, in this case, are arranged together in such a manner that they are movable, and shall be moved in operation, together to a first stroke position, which is also designated below as a setting position. When the punch is moved further axially, the punch sleeve is uncoupled from the punch such that simply just the punch is movable, and is also moved in operation during a hole punching operation, further to a front, second stroke position. Said second stroke position is also designated below as a hole punching position.

Said design is based on the consideration that a smaller punch diameter is typically necessary for the hole (punching) operation than for the exerting of a press-fit force onto the connecting element. The design described here ensures that, for press-fitting the connecting element, punch and punch sleeve define a common (enlarged) punch face, by way of which they move against a top surface of the connecting element and transmit the corresponding press-fit force. In the event of a setting operation, the punch head and the punch sleeve consequently act together on the press-fit element. To this end, it is provided, in particular, that the punch sleeve and the punch head realize a common end face up until the first stroke position is reached. At the first stroke position, said common end face is typically situated, in this case, in the interior of the hold-down clamp, that is to say above the top surface of the workpiece.

At the same time, however, it is ensured that in the event of a hole operation, just the central, inside punch moves further and punches a hole with a smaller diameter. The punch sleeve consequently moves no further than to a stroke position at the level of the top surface of the workpiece.

Conversely, in the case of the hole punching operation the punch head is extended further in the feed direction in relation to the punch sleeve and penetrates into the workpiece. In the second front stroke position, the punch head projects beyond the hold-down clamp in the feed direction.

Punch and punch sleeve, in this case, are expediently mounted with respect to one another by means of a mechanical forced guidance. Said forced guidance, in this case, is in such a manner that the punch sleeve is forcibly entrained to the first stroke position. The forced guidance is consequently controlled in a stroke-path-dependent manner and is preferably purely passive without any active actuators.

From a certain stroke position, especially the first stroke position, said mechanical forced guidance is advantageously eliminated such that when the punch is advanced further, the punch sleeve is not entrained.

An entrainment stop between punch and punch sleeve, which is moved out of engagement from a defined stroke position such that the forced coupling is therefore eliminated, is generally operative for this purpose.

A rotational movement between punch sleeve and punch is expediently provided for this purpose, the forced entrainment being eliminated and the entrainment stop moved out of engagement as a result of rotating the punch sleeve in relation to the punch.

To carry out said rotation, a groove-pin guide, having a pin and a guide groove, is expediently realized in such a manner that when there is axial relative displacement between the, in particular fixed, pin and the groove, a rotational movement is produced in the manner of a slotted guide. The groove/pin guidance generally comprises two components, namely the pin and the guide groove, the one component being realized in a fixed manner and the other component being realized on the punch or on the punch sleeve. The guide groove is provided in such a manner that when the components are displaced in a relative manner in the feed direction, they are rotated with respect to one another such that the desired rotation between punch and punch sleeve is effected. In particular, in this connection, the punch sleeve comprises the guide groove in which the fixed pin engages. The pin, in this case, is realized on an inner wall of the hold-down clamp, in particular as a radially protruding pin. Overall, the punch sleeve is consequently rotated in relation to the punch.

Along with said first independently inventive aspect of the setting unit, said setting unit comprises a second independently inventive aspect, namely a special design of the guiding of an ejector pin for a punching slug. Said aspect is claimed, in particular, in several dependent claims. The feature combination these claims, where applicable in combination with one of further dependent claim but without the features of the main independent claim is consequently deemed to be an independently inventive design. We reserve the right to submit a divisional application in this respect.

In this case, the ejector pin is activated expediently in a purely passive manner and is actuated together with the movement of the punch or rather of the plunger. Consequently, the ejector pin does not require its own drive. It is guided automatically by a mechanical forced coupling during the hole punching operation.

To this end, the ejector pin is, in particular, on the one hand, pressed by means of a compensating spring in the axial direction and is pulled by means of a return spring in opposition to the axial direction. A sufficiently high level of extrusion pressure to extrude the punching slug is consequently achieved by means of the compensating spring. At the same time, the returning of the ejector pin into the starting position is ensured by means of the return spring.

The compensating spring, in this case, is expediently connected to the ejector pin by means of a rocker arm. The compensating spring is consequently arranged laterally next to the ejector pin.

In addition, the return spring for the ejector pin is preferably arranged concentrically with respect to said ejector pin. It is supported, in this case, in particular by way of its one end on the punch and by way of its other end on a stop of the ejector pin. In this case, the spring force of the compensating spring is preferably greater than that of the return spring such that pressing the punching slug out of the workpiece into the die, which is located beneath, is ensured at least in the punching position.

The compensating spring acts in a preferred manner on a bolt and is supported, in particular, on the hold-down clamp. The bolt acts expediently on an end of the rocker arm. The bolt itself is preferably guided so as to be displaced in a sliding manner inside an upper part of the punch receiving means, for example in a bore. An, in particular adjustable, stop, which delimits the movement of the bolt, is arranged inside the bore. The adjustable stop is, in particular, a threaded pin.

The ejector pin is preferably entrained together with the punch up to a predefined stroke position (punching position) and, once the hole punching operation has been effected, is moved by the compensating spring relative to the punch in the feed direction for ejecting the punching slug.

Particularly important in the case of the setting unit described here is the fact that the control, on the one hand, of the hole (punching) or rather press-fitting operation and/or of the ejector pin is effected by means of the stroke movement of the plunger, controlled purely by the stroke path. The plunger of the drive unit, in this case, generally acts on the punch receiving means and displaces the same in the axial or setting direction. The punch receiving means expediently comprises, for this purpose, a central recess into which the plunger is able to enter. The punch penetrates into said central recess from the opposite side.

In addition, the hold-down clamp is expediently mounted against the punch receiving means by means of a hold-down clamp spring. In addition, a collar screw is expediently provided for connecting the punch receiving means to the hold-down clamp. Said collar screw is expediently mounted by way of its collar (head) inside the punch receiving means so as to be displaceable up to a stop. At the same time, the collar screw is screwable by means of a thread, in particular on the hold-down clamp, such that a permitted stroke path is adjustable.

The entire device shown here can be fastened, as an option, on a fixed processing machine, preferably however on a manipulator which is movable freely in space, in particular on a multi-axis industrial robot. To this end, in particular a carrier is fastened on a manipulator hand (robot hand) such that the entire device is movable quasi freely in space and to the desired operating position.

BRIEF DESCRIPTION OF THE SEVERAL VIEWS OF THE DRAWING

An exemplary embodiment of the invention is explained in more detail below by way of the figures, in which.

Identically acting parts are provided with the identical reference symbols in the figures.

DESCRIPTION OF THE INVENTION

Figure 1:
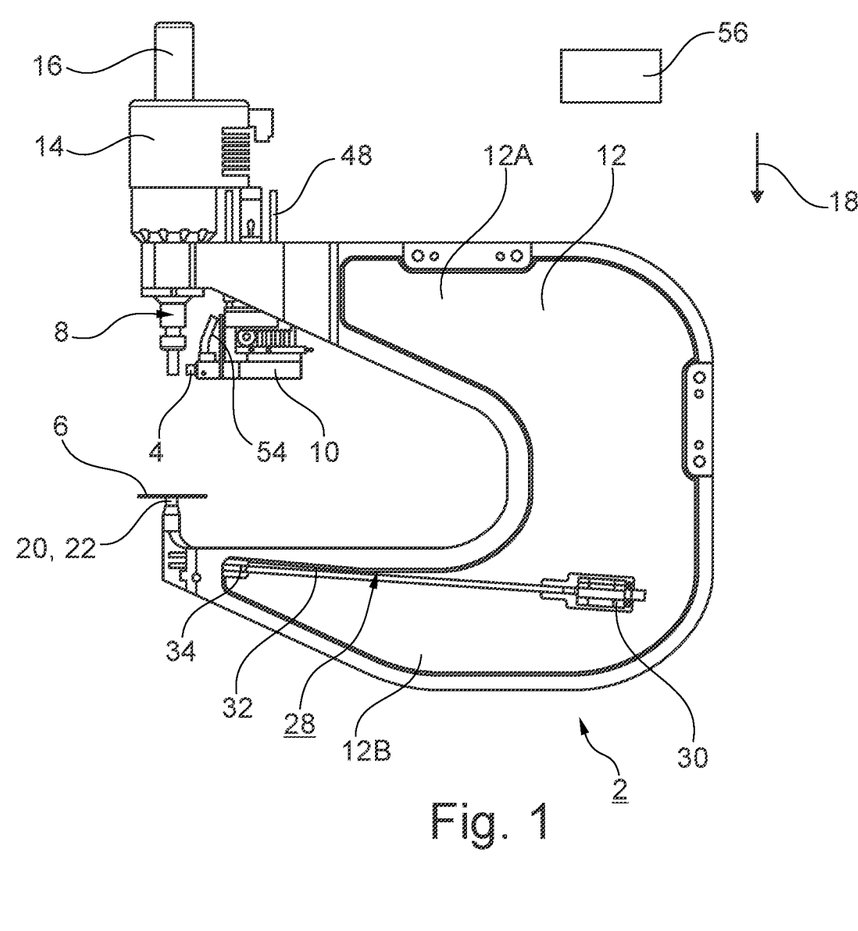
FIG. 1 shows a side view of a device for carrying out a setting operation for setting a connecting element, said device including a setting unit as well as a feed unit, both of which are situated in a starting position.

The device 2 shown in FIG. 1 serves for carrying out an, in particular multi-step, setting operation where a connecting element, which is realized as a press-fit element, is set on a workpiece 6, in particular a metal sheet. The connecting element 4 is, for example, a press-fit nut, a press-fit bolt (screw) or also a rivet. The connecting element 4 is, for example, a self-punching connecting element, for example a self-punching nut or a self-punching rivet. In principle, however, the device 2 is also realized for setting connecting elements 4 into pre-drilled workpieces 6.

The device 2 comprises a setting unit 8, by means of which the actual setting operation, that is to say the press-fitting of the connecting element 4, in the workpiece 6 is effected. In addition, the device 2 comprises a feed unit 10, which is realized for, in particular, side feeding of the connecting element 4 to the setting unit 8. The setting unit 8 and the feed unit 10 are arranged on a carrier 12. Said carrier—as shown in the exemplary embodiment—is preferably realized in the manner of an arcuate carrier 12, in particular in the manner of carrier curved in a C-shaped manner. Said carrier comprises an upper curved part 12A and a lower curved part 12B.

In addition, the device 2 comprises a first drive 14 which is, in particular, an electromotive drive. Said first drive 14 has assigned thereto a plunger 16 which is movable, in particular in an electromotive manner, in a feed direction 18. The setting unit 8 is fastened on the front end of the plunger 16. Said setting unit is moved in the feed direction 18 therefore by means of the plunger 16. The first drive 14, in this case, is fixed on the carrier 12, in particular on the front end of the upper curved part 12A.

In addition, the device 2 includes a holder 20 which is provided for supporting or for holding the workpiece 6. In operation, the workpiece 6 rests on said holder 20. Said holder 20, in this case, forms an, in particular, multi-part die 22. The holder 20 or rather the die 22 is arranged located opposite the setting unit 8 on the lower curved part 12B.

The die 22 comprises, in a manner not shown here in any detail, a basic body and a die punch which is adjustable inside the basic body. A drive mechanism 28 is provided for adjusting the die punch. Said drive mechanism includes a second drive 30 which is also realized, in particular, as an electric motor. In addition, the drive mechanism 28 includes an actuating rod 32 which is movable in its longitudinal direction by means of the second drive 30. Said actuating rod is connected at its front end to a rod assembly 34 which is connected, in turn, to the die punch.

The feed unit 10 is fastened on the carrier 12 by means of a linear guide 48 and can be moved to various positions in the feed direction 18. To transfer the connecting element 4 to the setting unit 8, said setting unit comprises a side feed opening. The feed is therefore generally effected at the side, for instance at right-angles to the feed direction 18. The feed unit 10 comprises, to this end, in particular, a feed punch or slider which is extendible in the transverse direction. Said feed punch or slider is actuated optionally in a pneumatic, hydraulic and in particular electromotive manner. The feeding of the connecting elements 4 to the feed unit 10 is effected in the exemplary embodiment by means of a feed tube 54.

The setting operation is generally controlled by means of a control device 56. Said control device controls, in this case, in particular, the first drive 14, the second drive 30 and the adjusting of the feed unit 10 along the linear guide 48 (which is also preferably effected by means of an electromotive drive).

The device 2 comprises several special aspects. A first aspect, which is described in detail in PCT/EP2016/080700, relates to the moving of the feed unit 10 together with the setting unit 8 in the feed direction 18, in particular to dynamic tracking of the feed unit 10 in the sequence of several consecutive setting operations (operating cycles). FIG. 1 shows the feed unit 10 and the setting unit 8 in a fully retracted starting position. Proceeding from said starting position, the feed unit 10 can be moved into arbitrary intermediate positions between the starting position and a setting position of the setting unit 8. A respective connecting element 4 is fed to the setting unit 8 in the respective intermediate position. In this case, the setting unit 8 and the feed unit 10 are expediently movable independently of one another in the direction of the setting or operating position such that an individual intermediate position can be assumed for the feed unit 10 which is independent of the respective position of the setting unit 8. Individual positioning of the feed unit 10 in an intermediate position close to the workpiece 6 is made possible due to said measure. This reduces the need for a resetting movement of the setting unit 8 after the actual setting operation for the necessary receiving of a further connecting element 4. Savings in process times and consequently a shorter cycle rate overall for a respective operating cycle are produced as a result.

A further essential aspect, which is an object of the present invention, is the special design of the setting unit 8, as is provided in the exemplary design in figs. 2A-2D and FIGS. 3A-3D. FIGS. 2A-2D each show a sectional view of the setting unit 8 along the cutting line II-II in FIG. 4 in various operating positions. FIGS. 3A-3D each show a sectional view of the setting unit 8 along the cutting line III-III in FIG. 4 in the various operating positions. FIG. 4 shows a top view of the setting unit 8 from above.

Figure 2A:
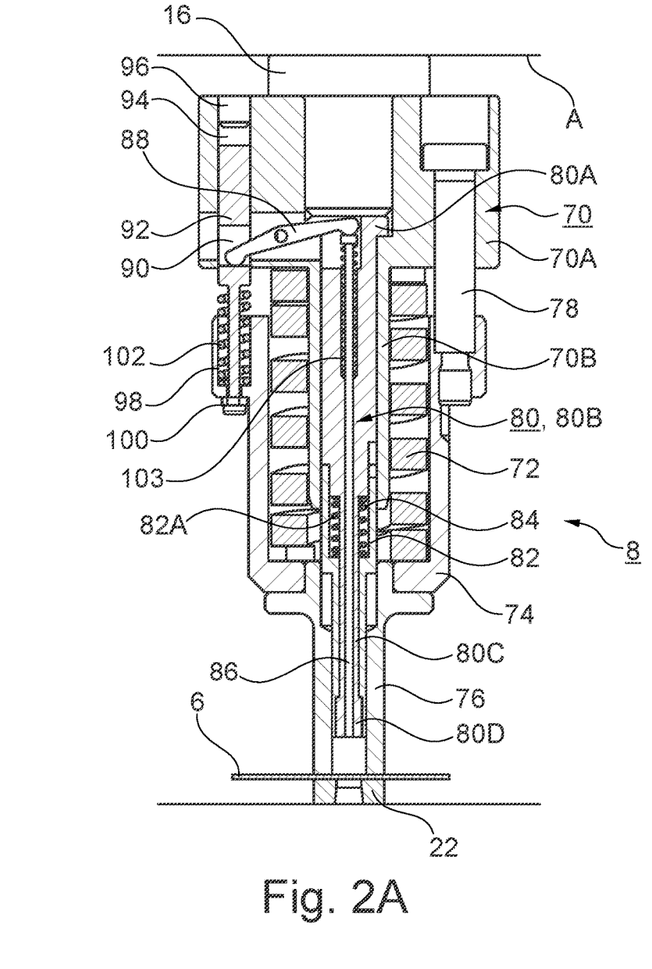
FIGS. 2A-2D show sectional views of the setting unit according to FIG. 1 along the cutting line II-II in FIG. 4 in different operating positions.
Figure 2B:
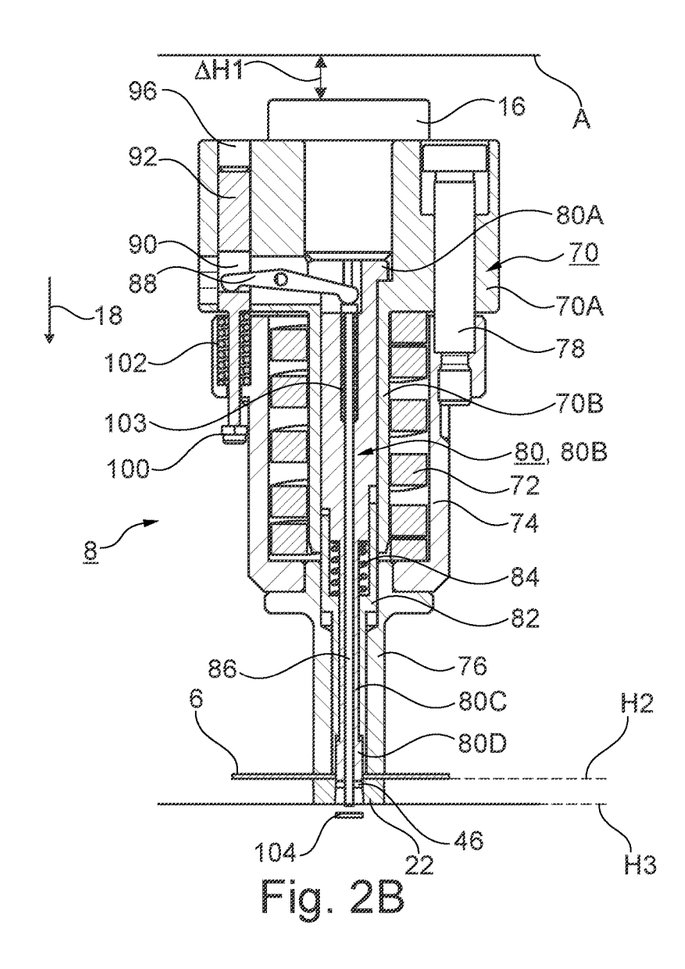
Figure 2C:
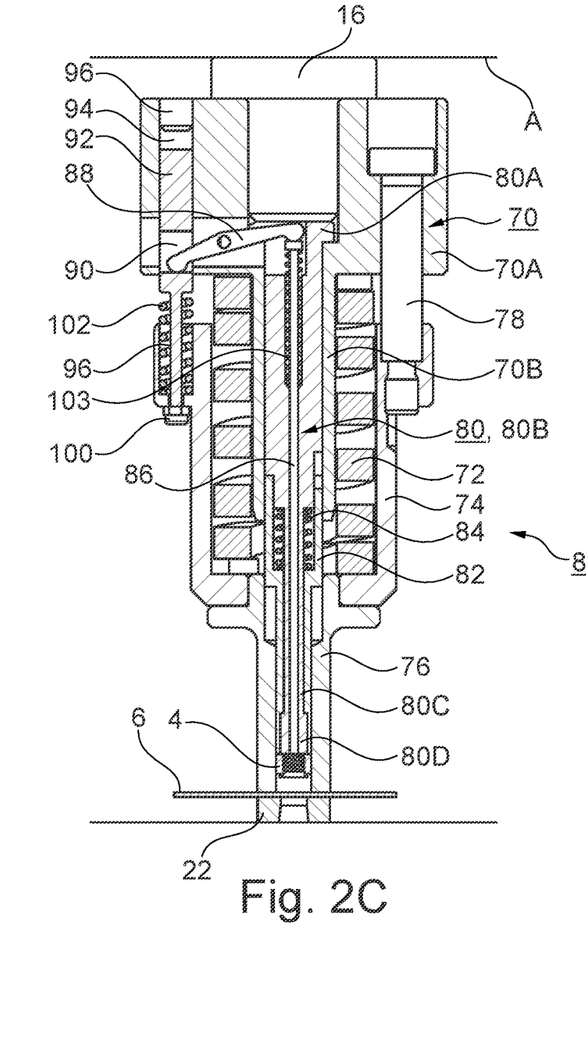
Figure 2D:
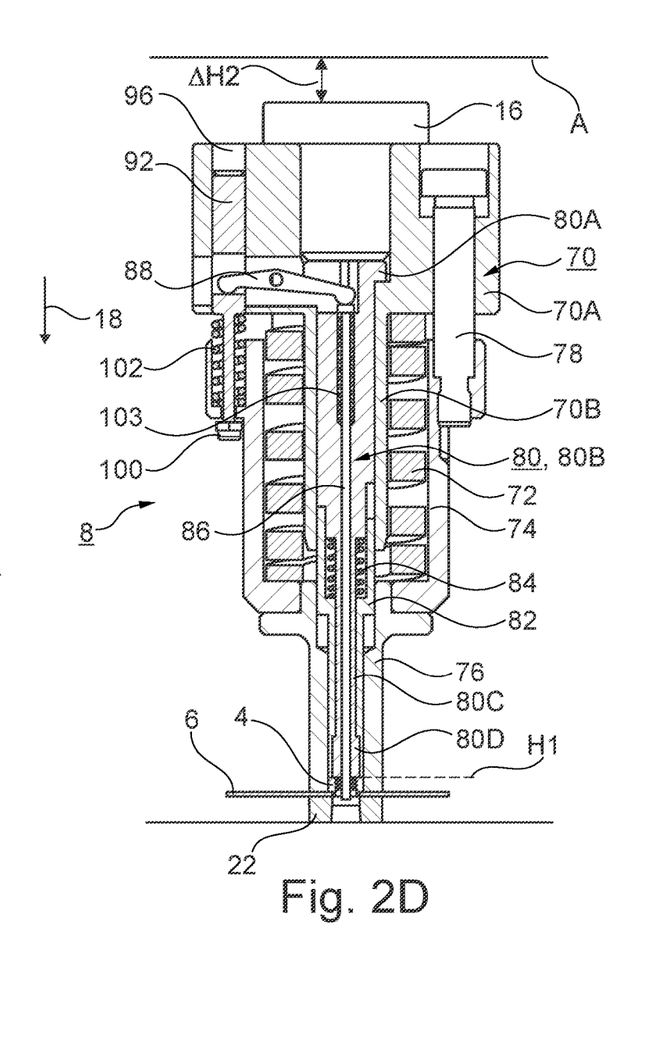
Figure 3A:
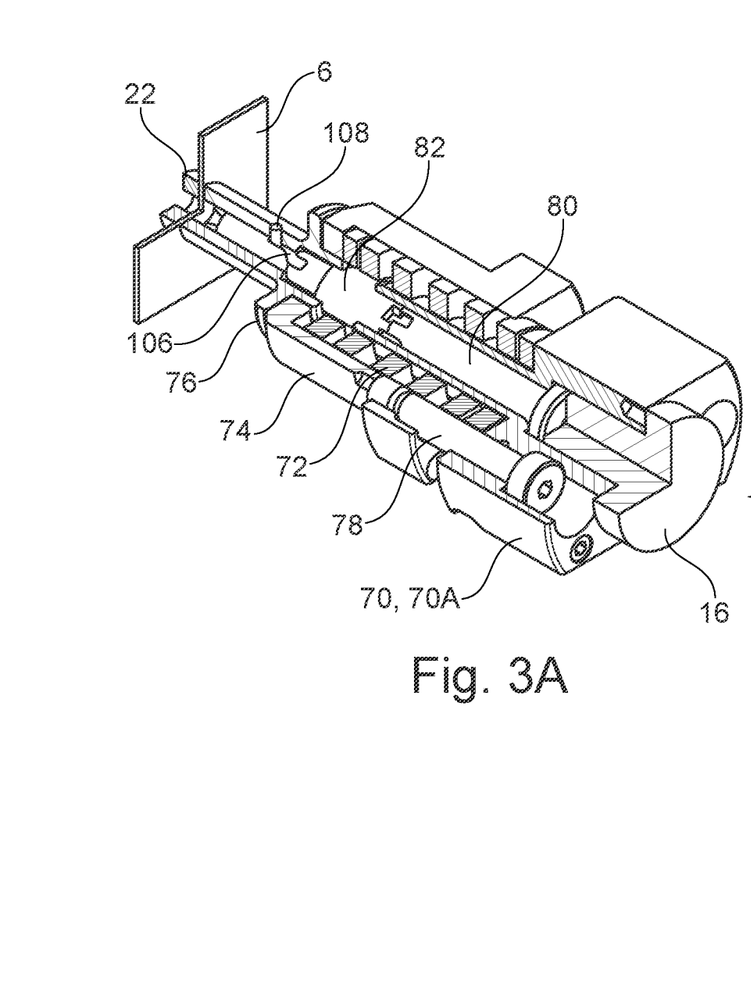
FIGS. 3A-3D show quarter sectional views of the setting unit along the cutting line III-III in FIG. 4 in the various operating positions shown in FIGS. 2A-2D and FIG. 4 shows a top view of the setting unit.
Figure 3B:
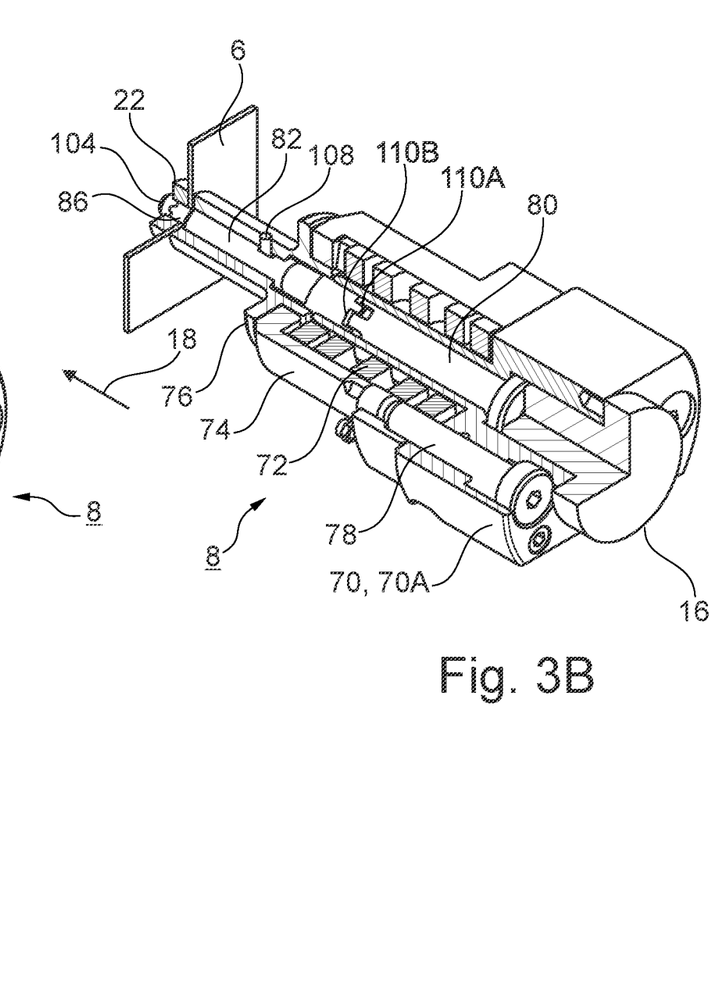
Figures 3C, 3D, 4:
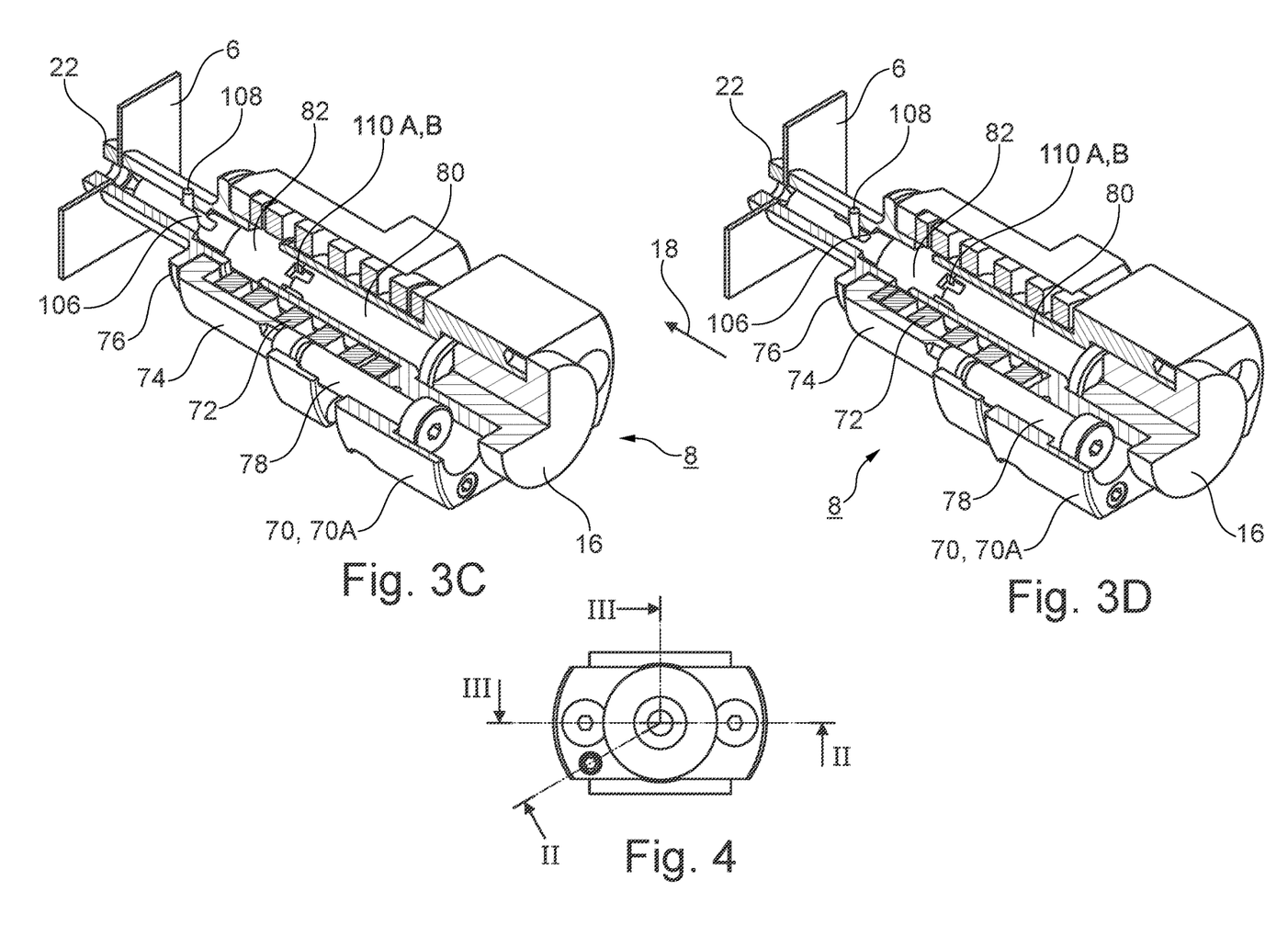

FIG. 2A, in this case, shows the setting unit 8 in a normal position, FIG. 2B shows the setting unit 8 after a hole punching operation has been effected after generating a hole 46 and when ejecting a punching slug 104 and FIG. 2C shows the setting unit 8 during a setting operation, after a nut (connecting element 4) has been fed to the setting unit 8 and prior to the actual press-fitting operation. Finally, FIG. 2D shows the state directly during the press-fitting or setting operation.

Corresponding to FIGS. 2A to 2D, FIGS. 3A to 3D show the identical operating positions as FIGS. 2A to 2D, but in isometric quarter sectional representations.

The setting unit 8 generally extends in the feed direction 18. In the upper region of the setting unit 8, an end piece of the plunger 16 of the first drive 14 is shown in each case. Said end piece is realized, in particular, in a T-shaped manner. The plunger 16 penetrates into a central recess of a punch receiving means 70 and exerts an axial travel movement on said punch receiving means. The punch receiving means 70 is an extensively massive block which is fastened on the carrier 12, in particular on the upper curved part 12A, with anti-rotation protection but so as to be displaceable with the plunger 16 in the axial direction and consequently in the feed direction 18.

A hold-down clamp 74 is mounted on the punch receiving means 70 against the spring force of a hold-down clamp spring 72. Said hold-down clamp preferably comprises a hold-down clamp insert 76 at its front end. Said hold-down clamp insert is preferably fastened so as to be replaceable, for example by means of a screw connection. The punch receiving means 70 and the hold-down clamp 74 are connected by means of a screw 78, in particular a collar screw as shown. The punch 80 is guided inside the punch receiving means 70.

At its upper end, the punch 80 comprises a widened head part 80A, to which is connected in the feed direction 18 first of all an upper punch region 80B, to which is connected a lower punch region 80C and finally at the end a punch head 80D. The individual part pieces of the punch 80, in this case, are each realized as sleeves. The lower punch region 80C, in this case, comprises a smaller diameter compared to the upper punch region 80B and in a preferred manner also compared to the punch head 80D, the transitions being realized in each case in a step-like manner by the realization of stops. The punch head 80D is realized, in particular, as a punch head.

In addition, a punch sleeve 82, which surrounds the punch 80 in particular in a concentric manner in a part region, is arranged in a lower region of the setting unit 8. In particular, the punch sleeve 82 surrounds the lower punch region 80C and also the punch head 80D. On its upper end, the punch sleeve 82 comprises a receiving region 82A in which a front region, which is tapered in a pin-like manner, of the upper punch region 80B penetrates. The upper punch region 80B is supported, in this case, in the receiving region 82A preferably by means of a spring 84 on the punch sleeve 82.

The punch receiving means 70 comprises a widened upper part 70A with a central receiving means for the punch head 80A. A sleeve-shaped guide part 70B of the punch receiving means 70 connects to the widened upper part 70A. In operation, the plunger 16 acts on the punch head 80A from above and presses the same against a stop of the punch receiving means 70, which is realized on the end of the central receiving means of the upper part 70A. The punch 80 and the punch receiving means 70 are fixed together in this case, in particular in all four operating positions shown, in each case by means of the plunger 16. The guide part 70B extends over the entire length of the upper punch region 80B, which is guided so as to be displaceable in a sliding manner in the guide part 70B.

The hold-down clamp 74 usually surrounds the guide part 70B in a concentric manner with the hold-down clamp spring 72 arranged in between. Said hold-down clamp spring is supported at the one end on a front stop of the hold-down clamp 74 and at the other end on the upper part 70A of the punch receiving means 70, in particular in a step-shaped transition region from the upper part 70A to the guide part 70B.

On its upper end, the hold-down clamp 74 additionally comprises a widened collar 70C, into which the screw 78 is screwed. A screw head of the screw 78 is guided in a head receiving means, which is realized in the widened upper part 70A at the side next to the central receiving means for the punch head 80A.

An ejector pin 86 is guided concentrically inside the punch 80. A rocker arm 88 acts on a head of the ejector pin 86 by way of a first arm. A second arm is supported in a recess 90 of a bolt 92, which is guided, in turn, so as to be displaceable in a sliding manner inside a bore 94 of the punch receiving means 70. The bore 94, in this connection, is realized in the widened collar 70A of the punch receiving means 70. An adjustable stop 96, which is formed, in particular, by a threaded pin, is realized inside said bore 94. The lower region of the bolt 92 is guided through an edge-side receiving means 98 of the hold-down clamp 74 and is secured at the end by way of an adjusting nut 100. A compensating spring 102 (compression spring), which is supported at the one end on the hold-down clamp 74 and at the other end on the bolt 92, is arranged inside the receiving means 98. The compensating spring 102 presses the bolt 92 and consequently the second rocker arm of the rocker arm 88 upward. A compression spring, which is designated as return spring 103, also acts on the oppositely situated first rocker arm. Said compression spring is supported in the interior of the punch 80. The head part 80A of the punch 80 comprises a side recess, in which the first rocker arm of the rocker arm 88 engages in order to be supported on an upper head of the ejector pin 86. The recess allows the rocker arm 88 to pivot inside the head part 80A. Adjustment of the end position of the ejector pin 86, in particular in the normal position, is possible by means of the adjusting nut 100. In addition, adjustment of a lower end position of the ejector pin 86 is made possible by means of the stop 96. Overall, the stroke position of the ejector pin 86 is consequently adjustable.

The movement sequence for the various operations is as follows:

The plunger 16 is first of all moved in the feed direction 18 out of the normal position (FIGS. 2A, 3A), as a result of which the punch 80 and also the hold-down clamp 76 are moved together in the feed direction 18. There is forced guidance between the punch 80 and the punch sleeve 82 such that the punch sleeve 82 is also entrained. When the workpiece 6 is reached, the hold-down clamp 76 sets on the workpiece 6 and presses said workpiece 6 against the die 22 such that the workpiece 6 is clamped. When the plunger 16 is fed further, the punch receiving means 70 (and with this the punch 80) is displaced relative to the hold-down clamp 76 against the force of the hold-down clamp spring 72. The forced guidance between the punch 80 and the punch sleeve 82 is eliminated no later than on reaching the workpiece 6, that is to say a component surface, preferably somewhat beforehand at a first stroke position (setting position) H1 (FIG. 2D), and only the punch 80 is displaced further forward up to a second stroke position (punching position) H2 (FIG. 2B). The punch head 80D is realized as a punching element which punches through the workpiece 6 when displaced further such that a punching slug 104 is generated.

The forced guidance between the punch 80 and the punch sleeve 82 and the elimination thereof is clear, in particular, by way of FIGS. 3A to 3D: The punch sleeve 82 comprises a guide groove 106 in which a fixed guide pin 108 engages. The guide pin 108, in this case, is fastened on the hold-down clamp 74, in particular on the hold-down clamp insert 76. In a front part region, the guide groove 106 extends, in this case, initially strictly in the axial direction, that is to say in the feed direction 18, before then in a central deflecting region swerving somewhat in the radial direction and then merging again into an axial end portion. In the case of an axial feed, this results, when the central deflecting region is reached, in the punch sleeve 82 being rotated relative to the punch 80.

In addition, entrainment stops 110A, B (FIG. 3B) are realized in the rear region between the punch 80 and the punch sleeve 82. In the exemplary embodiment, this is realized by a more or less crenellated circumferential contour. Said contour comprises crenellations and pockets. As can be seen in particular from FIG. 3A, the crenellations are initially located opposite one another. After a slight rotation of the punch sleeve 82 relative to the punch 80, the crenellations of the punch sleeve 82 then engage in the pockets of the punch 80 such that the forced guidance is eliminated at least for a certain axial stroke and the punch 80 is able to move further relative to the punch sleeve 82. The relative displacement in the feed direction 18, in this case, is determined in a preferred manner by means of the depth of the pockets. In the case of the backward movement, the punch sleeve 82 is pressed into the front position again by means of the spring 84 and the normal position (FIG. 2A) is resumed once again.

As can be seen additionally from FIG. 2B, the ejection of the punching slug 104 is effected by means of the ejector pin 86 prior to returning into the normal position. Said ejector pin is pressed downward by means of the compensating spring 102 and by means of the rocker arm 88. The spring force of the compensating spring 102 is greater for this purpose than that of the return spring 103. The upper stroke position of the ejector pin 86 is adjusted by means of the adjusting nut 100. I.e. the adjusting nut 100 forms a quasi block in the normal position such that the compensating spring 102 is not able to press the bolt 92 upward. If the plunger 16 moves downward, the punch receiving means 70 is moved downward relative to the hold-down clamp 74. The adjusting nut 100 no longer abuts against the hold-down clamp 74 and therefore no longer blocks the bolt 92. In a preferred manner, the compensating spring 102 is compressed. The bolt 92 can be pressed upward by the compensating spring 102, in particular as far as the stop 96, as a result of which a lower stroke position H3 of the ejector pin is fixed (cf. FIG. 2B).

As soon as the punching slug 104 is punched out by means of the punch 80, this results in the ejector pin 86 being pressed further downward by the compensating spring 102 and the punching slug 104 being transferred into the die 22. During the return movement into the normal position, the ejector pin 86 is pressed upward by the return spring 103.

The sequence of movement for press-fitting a press-fit element 4 (connecting element, press-fit nut) (setting operation) is comparable in principle. A decisive difference, however, consists in the punch 80 reaching no further than just the setting position, that is to say the first stroke position H1 (FIG. 2D) such that, therefore, no uncoupling is effected between punch sleeve 82 and punch 80. Rather, punch 80 and punch sleeve 82 form a common punch component with a common end face, which is located in a plane, acts on the top surface of the connecting element 4 and jointly exerts a pressing force for press-fitting the same into the pre-drilled workpiece 6.

FIGS. 2C, 2D, in this case, show a setting operation into a pre-drilled workpiece 6. In principle, however, self-punching connecting elements, in particular so-called piercing nuts, can also be used such that moving such a piercing nut into a pre-drilled workpiece 6 is also made possible.

A punching slug 104, which is automatically ejected by the ejector pin 86, occurs once again in the case of such self-punching connecting elements 4. Said ejector pin is consequently adjusted, in particular, in such a manner that it penetrates somewhat through the workpiece 6 even when setting a connecting element 4, as can be seen, for example, by way FIG. 2D. The adjusting of the ejector pin 86 is generally effected by means of the adjusting nut 100 and the stop 96. In the case of pre-drilled components, the ejector pin 86 (in the setting position) consequently runs into the hole 46 in the component.

Controlling whether it is a hole punching operation (FIG. 2A, 2B) or simply a setting operation (FIG. 2C, 2D) is achieved exclusively by the default of various plunger strokes ΔH, that is to say ultimately by the drive 4 (electric drive). Proceeding from the normal position according to FIG. 2A, for the hole punching operation (FIG. 2B), the plunger 16 is moved, proceeding from the starting stroke position A, in the feed direction 18 by a first plunger stroke ΔH1 such that the end position shown in FIG. 2B is reached. After said hole punching operation, the setting unit 8 moves into the normal position again (FIG. 2A, 2C) and receives a press-fit element 4, in particular a nut. For the following setting operation, the plunger 16, proceeding from the starting stroke position A, is moved by a second plunger stroke ΔH2 such that the end position shown in FIG. 2D is reached. In this case, the second plunger stroke ΔH2 in the case of the setting operation is smaller, for example by approximately half compared to the first plunger stroke ΔH1 in the case of the hole punching operation. At the same time, the ejector pin 86 is also controlled purely by the stroke path of the plunger 16. No active control elements are necessary or arranged.

LIST OF REFERENCES

2 Device
4 Connecting element
6 Workpiece
8 Setting unit
10 Feed unit
12 Carrier
12A Upper curved part
12B Lower curved part
14 First drive
16 Plunger
18 Feed direction
20 Holder
22 Die
24 Basic body
26 Die punch
28 Drive mechanism
30 Second drive
32 Actuating rod
34 Rod assembly
46 Hole
48 Linear guide
54 Feed tube
56 Control device
70 Punch receiving means
70A Upper part of the punch receiving means
70B Guide part
72 Hold-down clamp spring
74 Hold-down clamp
76 Hold-down clamp insert
78 Screw
80 Punch
80A Head part
80B Upper punch region
80C Lower punch region
80D Punch head
82 Punch sleeve
82A Receiving region
84 Spring
86 Ejector pin
88 Rocker arm
90 Recess
92 Bolt
94 Bore
96 Stop
98 Receiving means
100 Adjusting nut
102 Compensating spring
103 Return spring
104 Punching slug
106 Guide groove
108 Guide groove
110A,B Entrainment stop
H1 First stroke position
H2 Second stroke position
G3 Lower stroke position of the ejector pin
ΔH1 First plunger stroke
ΔH2 Second plunger stroke
A Starting stroke position

The invention claimed is:

1. A setting unit for setting a connecting element on a work piece, the setting unit comprising:

a hold-down clamp;

a plunger;

a punch displaceably mounted in said hold-down clamp in a feed direction upon being driven by said plunger, said punch having a forward punch head a punch sleeve surrounding said punch head;

said punch sleeve being movably disposed in the feed direction together with said punch into a first stroke position;

said punch head being movably disposed relative to said punch sleeve into a second stroke position;

said punch head and said punch sleeve being configured to cooperate to enable a hole punching operation and a setting operation to be carried out.

2. The setting unit according to claim 1, wherein said punch sleeve and said punch head together form a common end face during a movement into the first stroke position.

3. The setting unit according to claim 1, wherein said punch head extends out of said hold-down clamp in the feed direction in the second stroke position.

4. The setting unit according to claim 1, wherein said punch is a one piece element, said punch has a head part at an upper end thereof, said punch extends from said head part to the punch head and for press-fitting the connecting element into the work piece during the setting operation, said punch head and the punch sleeve move against a top surface of the connecting element and transmit a press-fit force.

5. The setting unit according to claim 1, wherein said punch and said punch sleeve are mounted to one another by way of mechanical guidance.

6. The setting unit according to claim 5, wherein mechanical guidance is dependent upon a stroke position.

7. The setting unit according to claim 1, wherein said punch sleeve and said punch are rotatable relative to one another, said punch mechanically drives said punch sleeve up to the first stroke position by way of a stop and wherein, as a result of rotation, the mechanical driving is eliminated and said stop is moved out of engagement.

8. The setting unit according to claim 7, which comprises a groove-pin guide, having a pin and a guide groove, configured to carry out the rotation wherein, upon an axial relative displacement between said pin and said groove, said groove-pin guide forms a slotted guide causing the rotation.

9. The setting unit according to claim 1, further comprising an ejector pin guided inside said punch for ejecting a punching slug.

10. The setting unit according to claim 1, further comprising a ejector pin guided inside said punch and actuated in a purely passive manner on account of a movement of said plunger.

11. The setting unit according to claim 10, which comprises a spring being a compensating spring pressing said ejector pin in the feed direction in the direction of the work piece or a return spring pulling said ejector pin counter the feed direction away from the work piece.

12. The setting unit according to claim 11, further comprising a rocker arm disposed to cause said compensating spring to act on said ejector pin.

13. The setting unit according to claim 12, wherein said compensating spring acts on a bolt against which said rocker arm is supported, wherein said bolt is guided, at the one end, in a bore of a punch receiving means and, at the other end, by part of said hold-down clamp and is secured by way of an adjusting nut.

14. The setting unit according to claim 11, wherein the setting unit is controlled exclusively by way of a stroke movement of said plunger.

15. The setting unit according to claim 11, wherein said ejector pin is entrained together with the punch and, once the hole punching operation has been carried out, is moved relative to said punch by said compensating spring.

16. The setting unit according to claim 15, wherein said punch is held in a punch receiving device and said hold-down clamp is supported against the punch receiving device by way of a hold-down clamp spring.

17. A method for setting a connecting element on a work piece, the method comprising:

providing a setting unit according to claim 1;

selectively carrying out a hole punching operation or a setting operation with the one punch in connection with the punch sleeve.

18. A setting unit for setting a connecting element on a work piece, the setting unit comprising:

a hold-down clamp;

a punch displaceably mounted in said hold-down clamp, said punch having a forward punch head for piercing the work piece and producing a punching slug;

a plunger disposed to drive said punch in a feed direction toward the work piece; and an ejector pin guided inside said punch and through said punch head, said ejector pin configured for ejecting the punching slug by purely passive actuation on account of a movement of said plunger.

19. The setting unit according to claim 18, which comprises a spring being a compensating spring pressing said ejector pin in the feed direction in the direction of the work piece or a return spring pulling said ejector pin counter the feed direction away from the work piece.

20. The setting unit according to claim 19, further comprising a rocker arm disposed to cause said compensating spring to act on said ejector pin.

21. The setting unit according to claim 20, wherein said compensating spring acts on a bolt against which said rocker arm is supported, wherein said bolt is guided, at the one end, in a bore of a punch receiving means and, at the other end, by part of said hold-down clamp and is secured by way of an adjusting nut.

* * * * *